United States Patent [19]
Yoshida

[11] Patent Number: 5,581,373
[45] Date of Patent: Dec. 3, 1996

[54] IMAGE COMMUNICATION APPARATUS HAVING A COMMUNICATION ERROR CHECK FUNCTION

[75] Inventor: Takehiro Yoshida, Tokyo, Japan

[73] Assignee: Canon Kabushiki Kaisha, Tokyo, Japan

[21] Appl. No.: 76,780

[22] Filed: Jun. 15, 1993

[30] Foreign Application Priority Data

Jun. 19, 1992 [JP] Japan .................... 4-186369

[51] Int. Cl.⁶ .................. H04N 1/32; H04N 1/00; H04N 1/04
[52] U.S. Cl. .............. 358/476; 358/468; 358/405
[58] Field of Search ................. 358/476, 261.1, 358/400, 401, 403, 405, 439, 468, 404, 444; 382/56; 371/37.1, 37.7

[56] References Cited

U.S. PATENT DOCUMENTS

| | | | |
|---|---|---|---|
| 4,876,604 | 10/1989 | Nobuta | 358/400 |
| 4,887,164 | 12/1989 | Takahashi | 358/443 |
| 5,073,827 | 12/1991 | Nakajima | 358/437 |
| 5,075,783 | 12/1991 | Yoshida et al. | 358/439 |
| 5,077,742 | 12/1991 | Tsumura et al. | 371/32 |
| 5,086,487 | 2/1992 | Katayama et al. | 382/56 |
| 5,119,210 | 6/1992 | Baba | 358/444 |
| 5,172,246 | 12/1992 | Yoshida | 358/406 |
| 5,220,439 | 6/1993 | Yoshida | 358/404 |

FOREIGN PATENT DOCUMENTS

| | | |
|---|---|---|
| 0201772 | 11/1986 | European Pat. Off. . |
| 2635627 | 2/1990 | France . |
| 3925671 | 2/1991 | Germany . |
| 1282665 | 11/1989 | Japan . |

OTHER PUBLICATIONS

Canon FAX–L770 Instruction Book, pp. 25–38 and 52–57, 1990.

*Primary Examiner*—Kim Vu
*Assistant Examiner*—Kimberly A. Williams
*Attorney, Agent, or Firm*—Fitzpatrick, Cella, Harper & Scinto

[57] ABSTRACT

An image communication apparatus is operable in a reception mode for received coded image data and detecting a communication error by checking specific information in the received image data. The coded data is received in a reception operation and stored in a memory in a storing operation, and a control circuit controls both operations. Specifically, the control circuit effects the storing operation in response to a manual instruction during the reception mode, and checks the specific information without decoding the received image data. The control circuit effects both the reception and storing operations in parallel during the reception mode.

12 Claims, 11 Drawing Sheets

IMAGE COMMUNICATION APPARATUS HAVING A COMMUNICATION ERROR CHECK FUNCTION

BACKGROUND OF THE INVENTION

1. Field of the Invention

The present invention relates to an image communication apparatus having an improved communication error check function.

2. Related Background Art

There is known a conventional facsimile apparatus that can perform parallel operations. This conventional facsimile apparatus needs a controller, which has a complicated structure and high cost, because the facsimile apparatus effects both image reception control, which includes the operation of decoding received image data, and a local operation (e.g. reading an image, a copying operation etc.) in parallel.

SUMMARY OF THE INVENTION

In consideration of the foregoing, an object of the present invention is to provide an improvement in this type of image communication apparatus.

Another object of the present invention is to provide an image communication apparatus capable of effecting both image communication and a local operation in parallel by a simple and low cost controller.

These and other objects are accomplished by providing an image communication apparatus comprising control means for controlling both image reception and the local operation, that effects the local operation in response to a manual instruction during image reception when the image reception is performed in a mode which checks for communication errors by checking specific information that indicates errors without decoding the received image data.

Still other objects of the present invention, and the advantages thereof, will become fully apparent from the following description of the preferred embodiment to be taken in conjunction with the attached drawings.

BRIEF DESCRIPTION OF THE DRAWINGS

FIG. 8.

DETAILED DESCRIPTION OF THE PREFERRED EMBODIMENT

Now the present invention will be clarified by a detailed description of an embodiment thereof shown in the attached drawings.

Figure 1:
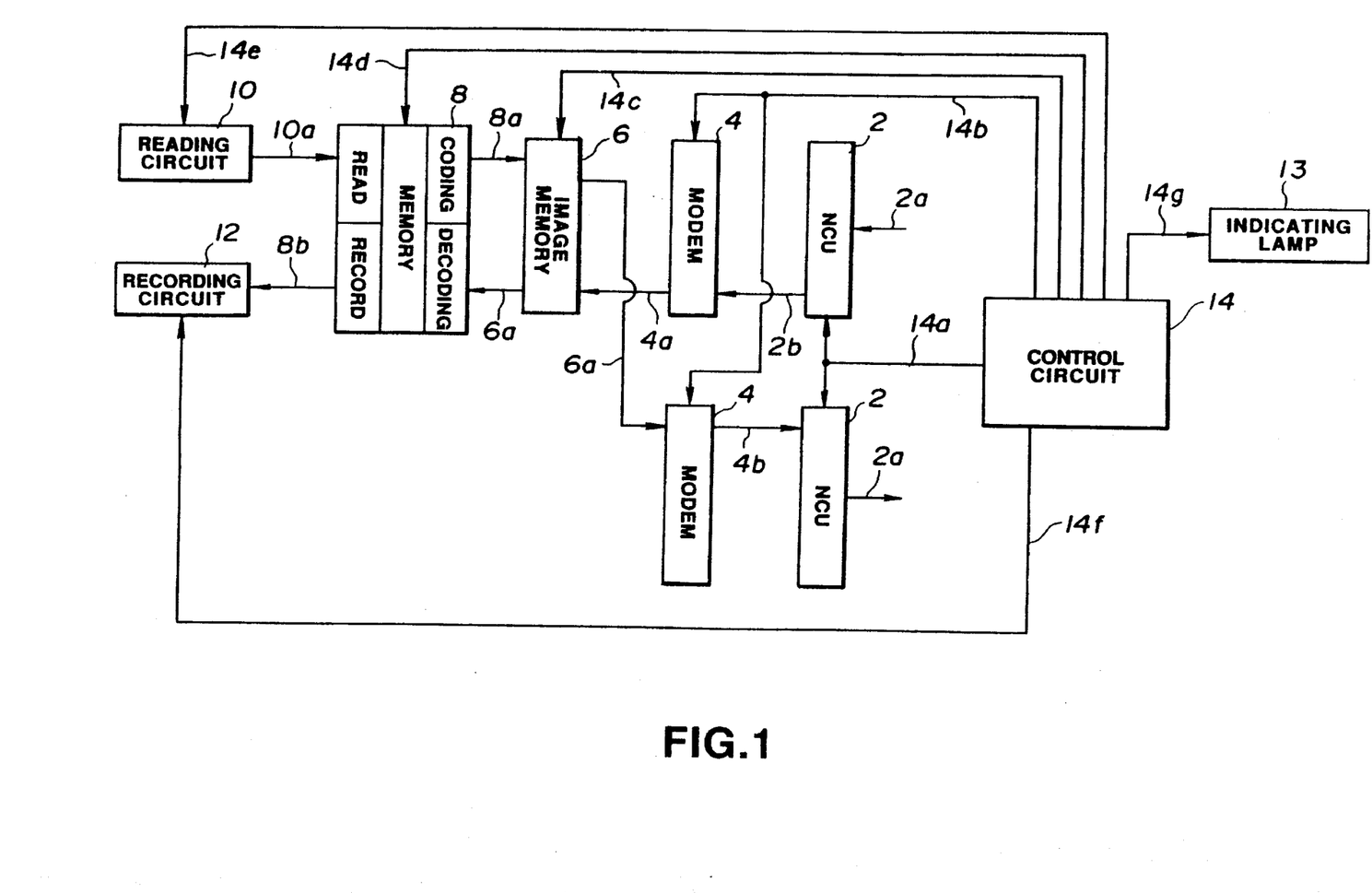
FIG. 1 is a block diagram showing a facsimile apparatus in a preferred embodiment of the present invention.

FIG. 1 is a block diagram showing the construction of a facsimile apparatus in the preferred embodiment. The facsimile apparatus is structured to be able to perform transmit and receive procedures in an error correction mode (ECM) which is defined by the CCITT (International Telephone & Telegraph Communication Committee).

The structure of the facsimile apparatus is as follows. An NCU (Network Control Unit) 2 is provided for connecting to and using a telephone network, for data and other communication. The NCU 2 connects a telephone line 2a to the facsimile terminal, controls connection between the telephone line 2a and a modem 4 or a telephone (unshown), and maintains a closed loop as appropriate. In FIG. 1, two NCUs (for receiving and transmitting) are shown for easy understanding. In reality, a single NCU 2 is used for both receiving and transmitting.

Information received through the telephone line 2a (received information) is sent from the NCU 2 to the modem 4, while information to be transmitted (transmission information) is sent from the modem 4 through the NCU 2 to the telephone line 2a. A changing operation between transmitting and receiving is controlled by a control signal 14a from a control circuit 14.

The modem 4 is provided for modulating and demodulating signals (image signals or control commands) according to the V21 (the V21 recommendation of CCITT), V27ter (the V27ter recommendation of CCITT), or the V29 (the V29 recommendation of CCITT). The modem 4 has the ability to perform framing (making an HDLC format signal), deframing (reproducing the signal from the framing HDLC format), and effecting the CRC (Cyclic Redundancy Check) of the HDLC format signal. In FIG. 1, two modems 4 (for transmitting and for receiving) are shown for easy understanding. In reality, a single modem 4 is used for both transmitting and receiving.

When the apparatus effects image reception, the modem 4 receives a received signal from the NCU 2 through a signal line 2b and demodulates the received signal. The modem 4 sends the demodulated signal to an image memory 6. When the apparatus effects image reception in accordance with the G3 recommendation of CCITT, the demodulated signal sent from the modem 4 to the image memory 6 is input to the control circuit 14, which decodes the demodulated signal and then discriminates whether or not one line of data has been received without error, and whether or not the received image data meets a predetermined standard (i.e. whether or not the received image data is correct). In G3 image reception, the control circuit 14 has to effect a decoding operation, which is a complicated operation.

On the other hand, when the apparatus effects image reception in accordance with the ECM (Error Correction Mode) recommendation of CCITT, the control circuit 14 discriminates the result of the CRC from the modem 4. This discriminating operation in ECM image reception is easier than the decoding operation in G3 image reception. Therefore, the control circuit 14 is able to effect both ECM image reception and a local operation (e.g. storing image data that will be transmitted (transmission data) into the image memory 6, copying etc.) in parallel.

When the apparatus effects image transmission, the modem 4 receives a signal from the image memory 6 through a signal line 6a, modulates the signal, and then sends the modulated signal to the telephone line 2a (through the NCU 2) to be transmitted. The control circuit 14 controls the modem 4 through a signal line 14b. The control operations of the modem 4 include, for example, setting a transmission speed, selecting the ECM or the G3 mode, etc.

The image memory 6 is provided for storing coded image data, HDLC format data, etc. The control circuit 14 controls the storing operations into the image memory 6 through a signal line 14c. The storing operations include, for example, storing the received information from the telephone line into the image memory 6, storing the coded information into the image memory 6, etc.

A codec 8 is provided for decoding and coding data. The codec 8 has three functions: decoding and outputting data for recording, inputting read data and coding it, and decoding and coding data. The codec 8 is used to effect a first operation of decoding and outputting data for recording and a second operation of inputting read data and coding in parallel.

When the apparatus effects image reception, the control circuit 14 causes the codec 8 to decode data corresponding to a previous page already received and stored in the image memory 6 and to send the decoded data to a recording circuit 12, at the same time as it receives data corresponding to a next page. In the case where the operation of storing transmission information read by a reading circuit 10 into the image memory 6 is selected by the control circuit 14, the control circuit 14 causes the codec 8 to input the read data from a signal line 10a and code it, and then to send the coded data to the image memory 6. In the case where the apparatus effects image transmission of data stored in the image memory 6 and when an operation of re-coding the data stored in the image memory 6 is selected by the control circuit 14, the control circuit 14 causes the codec 8 to decode the data stored in the image memory 6. Then the control circuit 14 inputs the decoded data from the codec 8 and effects image processing such as, for example, reduction or modification of line density etc. Then the control circuit 14 causes the codec 8 to re-code the processed image data.

The reading circuit 10 is provided for reading image information of an original document line by line in main scanning, and for outputting signals having two values: white and black. The reading circuit 10 has an imaging device such as a CCD (Charge Coupled Device), an optical system and so on. The reading circuit 10 further has a sensor for detecting a next original sheet to be sent, and provides information whether there is a next original sheet to the control circuit 14.

The recording circuit 12 is provided for recording decoded white and black signals from the codec 8 on a recording material sequentially and line by line.

An indicating lamp 13 is provided for indicating that the apparatus is in a condition capable of storing information to be sent into the image memory 6. When the signal level of a signal line 14g from the control circuit 14 is "1", the indicating lamp is turned on. On the other hand, when the signal level of the signal line 14g is "0", the indicating lamp is turned off.

The control circuit 14 is provided for controlling all the circuits mentioned above and the overall system of this facsimile apparatus, and is includes a CPU, memories and other conventional elements. The apparatus in this embodiment records image data on the recording material at a specific speed. When the apparatus effects image reception according to the G3 recommendation, the control circuit 14 decodes received data, checks for communication errors, and stores the received data into the image memory 6. Then, after finishing receiving data corresponding to one page, the control circuit causes the recording circuit 12 to record the received data of the received (previous) page at the specific speed while the apparatus is receiving data corresponding to a next page. When the apparatus effects G3 image reception, the control circuit 14 does not effect any local operation because the control circuit 14 is then decoding, which is a complicated operation. As a result, the indicating lamp 13 is turned off during G3 image reception, to show that data cannot be stored in the image memory 6.

On the other hand, when the apparatus effects image reception according to the ECM recommendation of CCITT, the control circuit 14 discriminates the result of the CRC by the modem 4 without decoding. The control circuit 14 then causes the recording circuit 12 to record the received data corresponding to the previous page at the specific speed while receiving data corresponding to a next page. The control circuit 14 is able to effect the local operation during ECM image reception because the discriminating process of the CRC is much easier than the process of decoding in G3 image reception. Therefore, the indicating lamp 13 is turned on when the apparatus is effecting ECM image reception and the image memory 6 has vacant memory area.

Further, when the apparatus is idle and the image memory 6 has vacant memory area, the indicating lamp 13 is turned on.

Figure 2:
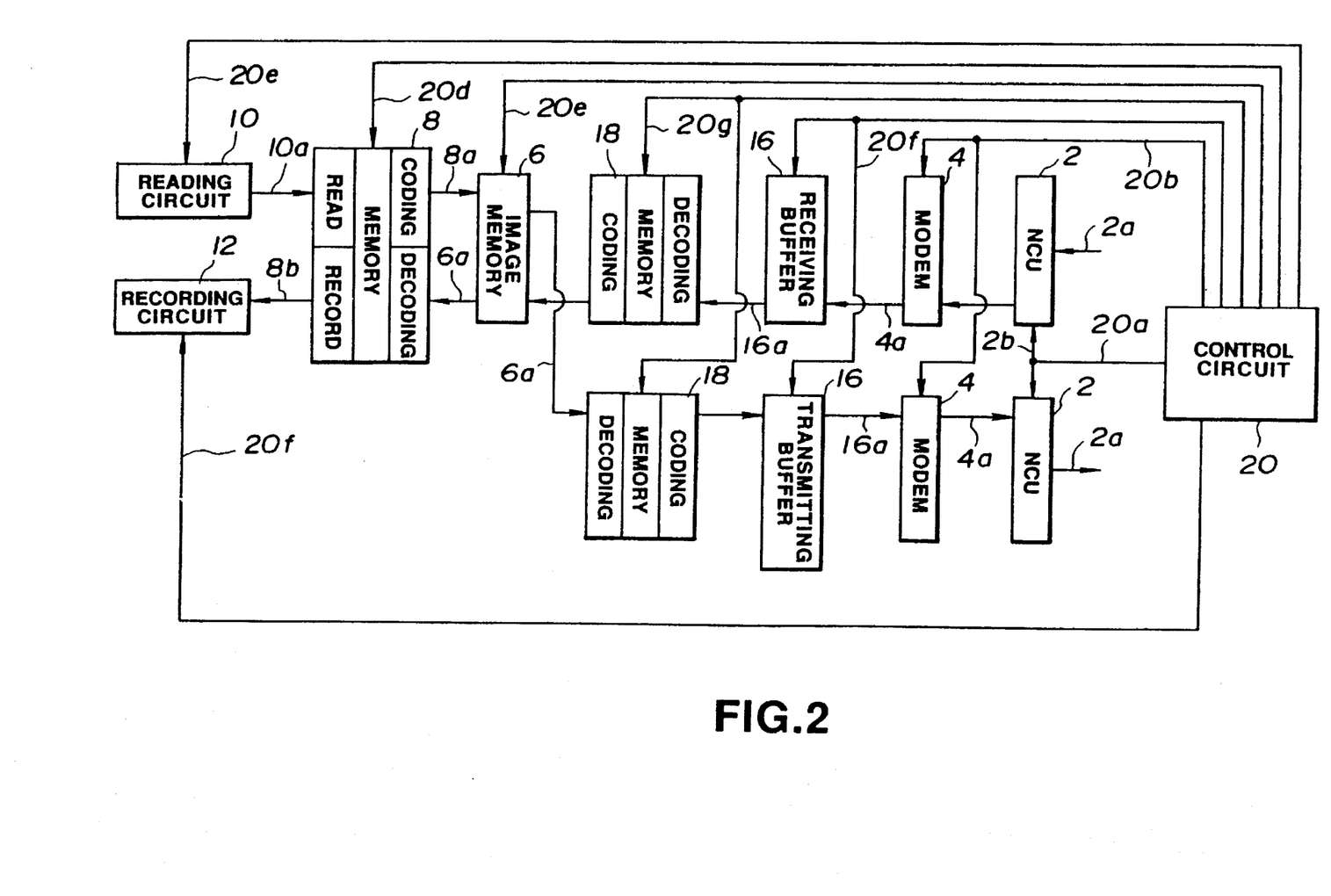
FIG. 2 is a further block diagram showing a facsimile apparatus according to the present invention.

As shown in FIG. 2, if a codec 18 (two are shown, for transmitting and for receiving, but in reality only one is used for both functions) for data communication and a buffer memory 16 (for transmitting and for receiving) are further provided, the apparatus is able to effect the local operation during G3 image communication. When the apparatus shown in FIG. 1 effects G3 image reception, the received data is stored in the buffer memory 16 (for receiving), and then is decoded by the codec 18 (for receiving). The control circuit 20 checks for communication errors in accordance with the decoded data. The decoded data is recoded by the codec 18 (for receiving), and then the recoded data is stored in the image memory 6. The recoding operation in the apparatus of FIG. 2 is the same as the one in the apparatus of FIG. 1. As above described, in the case where the buffer memory 16 and the codec 18 are further provided, the control circuit 20 does not itself perform the decoding process to check for communication errors. Therefore, the apparatus shown in FIG. 2 is able to effect the local operation during G3 image reception. However, the cost of the apparatus will be more expensive because of the additional codec 18.

The operation of the apparatus shown in FIG. 1 is explained as follows.

FIG. 3 through FIG. 6 are a flowchart showing a method of controlling processes by the control circuit 14.

Figure 3:
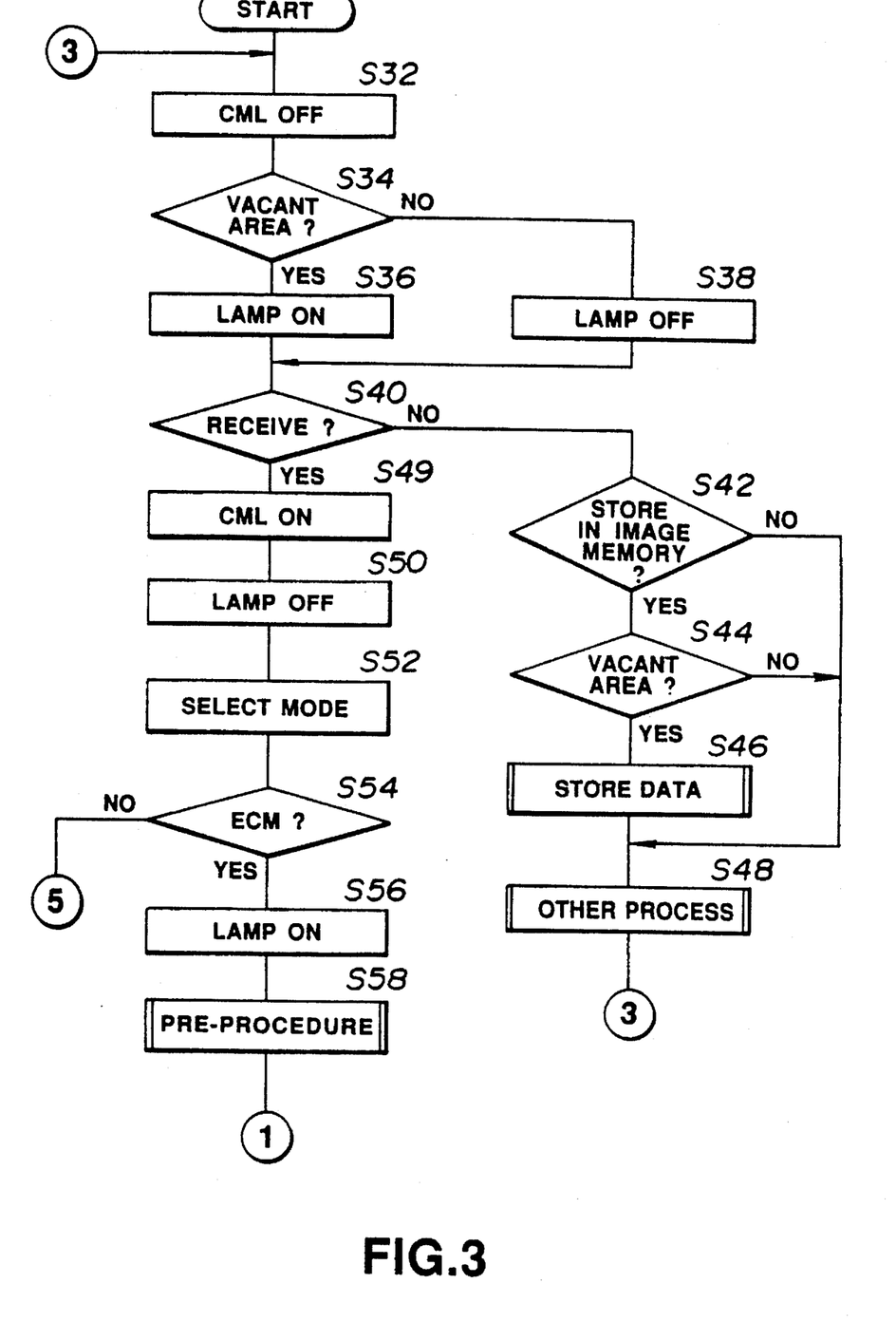
FIG. 3 through FIG. 6 together form a flowchart showing a control operation effected by the control circuit 14 of FIG. 1 when the apparatus effects facsimile communication.

Initially, the control circuit 14 turns off a CML relay (unshown) of the NCU 2 (step S32). The CML relay is a conventional relay which connects the telephone line 2a to the modem 4. Then the control circuit 14 discriminates whether or not the image memory 6 has any vacant area (S34). If the image memory has some vacant area, the control circuit 14 turns on the indicating lamp 13 (S36). If the image memory does not have any vacant area, the control circuit 14 turns off the indicating lamp 13 (S38).

Next, the control circuit 14 discriminates whether or not an image reception mode has been selected (S40). In the case where the image reception mode has been selected, the control circuit 14 turns on the CML relay (S49). In the case where the image reception mode has not been selected, the control circuit 14 effects a local operation. In the local operation, the control circuit 14 discriminates whether or not an operation of storing transmission data into the image memory 6 has been selected by an operator (S42). In the case where the storing operation has not been selected, the control circuit 14 effects another local operation (S47). On the other hand, in the case where the storing operation has been selected, the control circuit 14 checks if the image memory 6 has any vacant area or not (S44), and then starts the storing operation into the image memory 6 (S46). The image memory 6 functions using DMA (Direct Memory Access) to effect the storing operation.

If a receiving operation was selected in step S40, then after step S49, the control circuit 14 turns off the indicating lamp 13 (S50). Then the control circuit 14 effects a facsimile procedure for setting a communication mode (S52). In the facsimile procedure, the control circuit selects the G3 image reception mode or the ECM image reception mode in accordance with information from a destination, i.e. whether ECM reception is possible, and a manual instruction for designating the communication mode by the operator.

Figure 4:
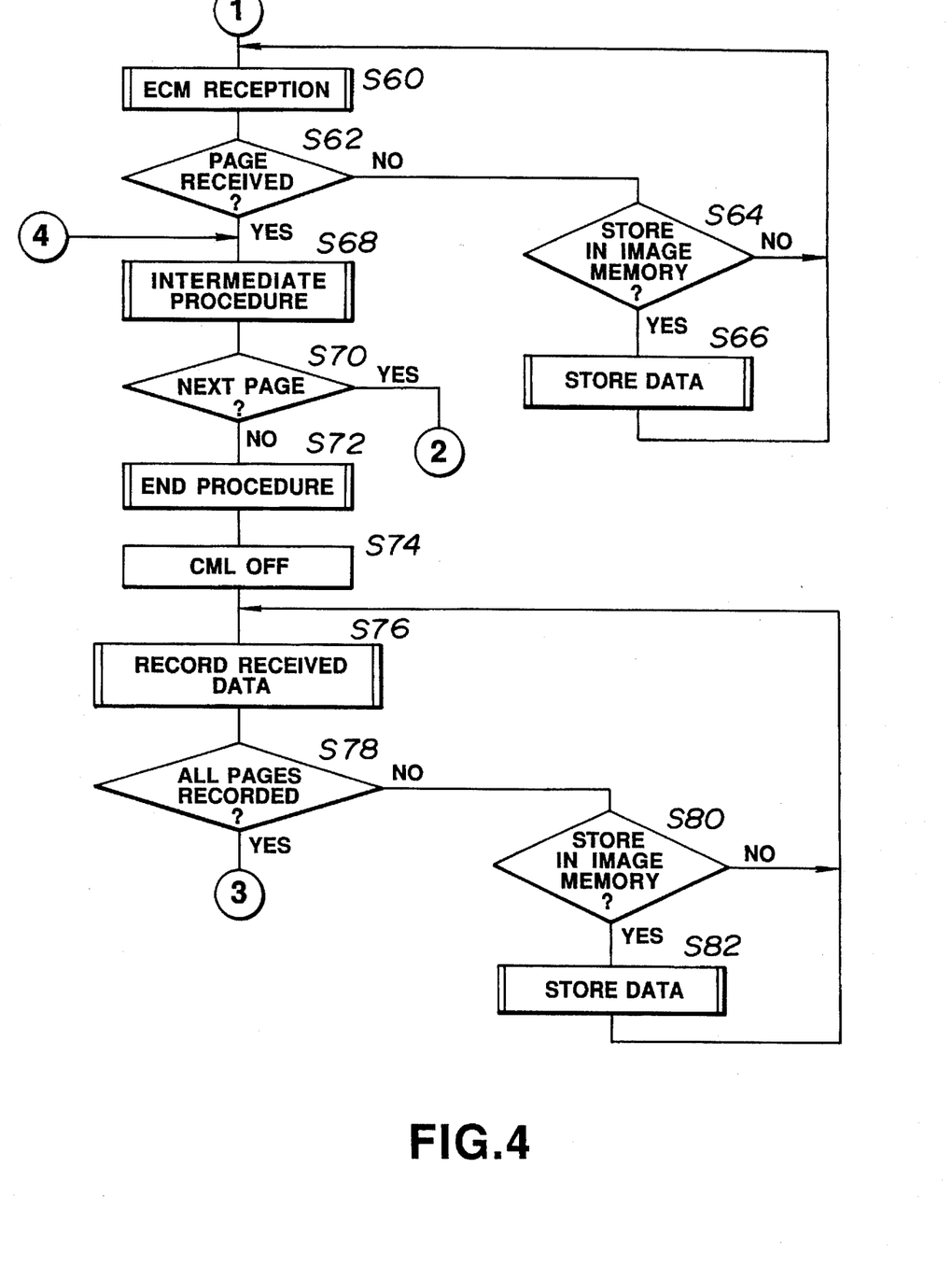

Next, the control circuit 14 discriminates whether or not the ECM image reception is selected (S54). In the case where the ECM image reception is selected, the control circuit 14 turns on the indicating lamp 13 (S56). After the control circuit 14 completes the facsimile pre-procedure (S57), it effects ECM image reception (S60) (FIG. 4). In step S60, the control circuit 14 inputs data demodulated by the modem 4, stores the demodulated data into the image memory 6 and checks whether or not the demodulated data has an error in accordance with the result of the CRC from the modem 4.

The control circuit 14 then discriminates whether or not data corresponding to one page have been received (S62). In the case where data corresponding to one page has not been received, the control circuit 14 discriminates if the local operation of storing transmission data into the image memory 6 has been selected (S64). If the storing operation has not been selected, the control circuit 14 returns from step S64 to step S60. If the storing operation has been selected, the control circuit 14 starts to effect the storing operation in step S66 and then returns to step S60.

Figure 5:
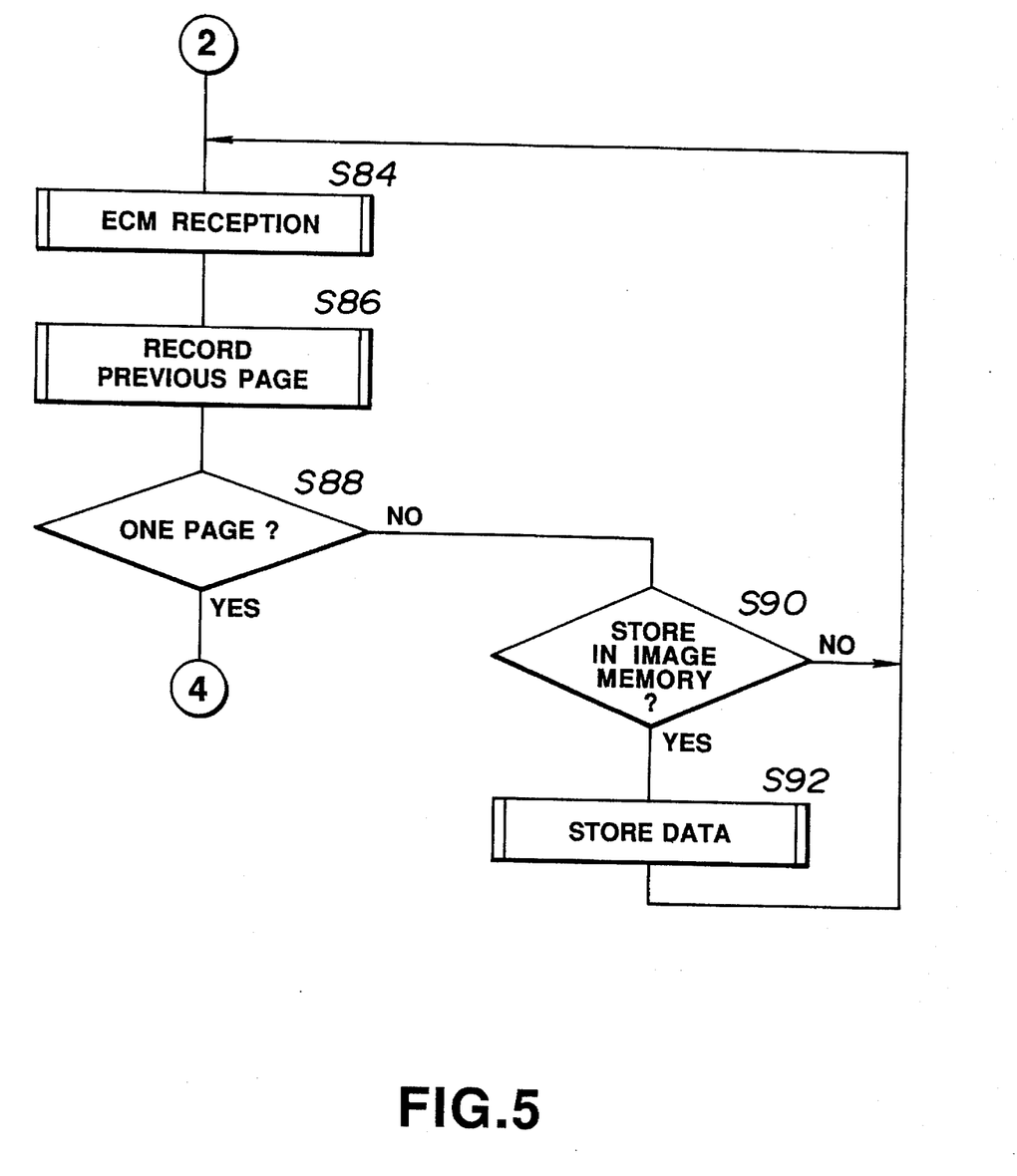

If the control circuit 14 discriminates that data corresponding to one page has been received in step S62, the control circuit 14 effects an intermediate procedure for confirming a condition of data communication (S68). Then the control circuit 14 discriminates whether or not image reception of a next page will be effected (S70). In the case where image reception of the next page is effected, the control circuit 14 shifts from step S70 to step S84 (FIG. 5). In the case where the image reception of the next page is not effected, the control circuit 14 effects an end procedure for releasing the telephone line (S72) and then turns off the CML relay (S74). Then the control circuit 14 starts a recording operation of the received data which has been stored in the image memory 6 (S76). The recording circuit 12 records the received data at a fixed speed. The control circuit 14 discriminates whether or not all of the received data has been recorded (S78), and if not, discriminates whether or not the local operation of storing transmission data into the image memory 6 has been selected (S80). In the case where all of the received data has been recorded, the control circuit 14 shifts from step S78 to step S32. In the case where the operation of storing the data to be transmitted into the image memory 6 has been selected, the control circuit 14 starts to effect the storing operation in step S82 and then returns to step S76.

On the other hand, in the case where the apparatus effects the image reception of the next page, the control circuit 14 starts the image reception according to ECM (S84 of FIG. 5). Then the control circuit 14 starts to effect the recording operation of the data corresponding to the previous page stored in the image memory 6 (S86). The control circuit 14 discriminates whether or not data corresponding to one page has been received (S88), and if not, discriminates whether or not the storing operation of transmission data has been selected (S90). In the case where data corresponding to one page has been received, the control circuit 14 shifts from step S88 to step S68. In the case where the storing operation has been selected, the control circuit 14 starts to effect the storing operation (S92), and then returns to step S84.

Figure 6:
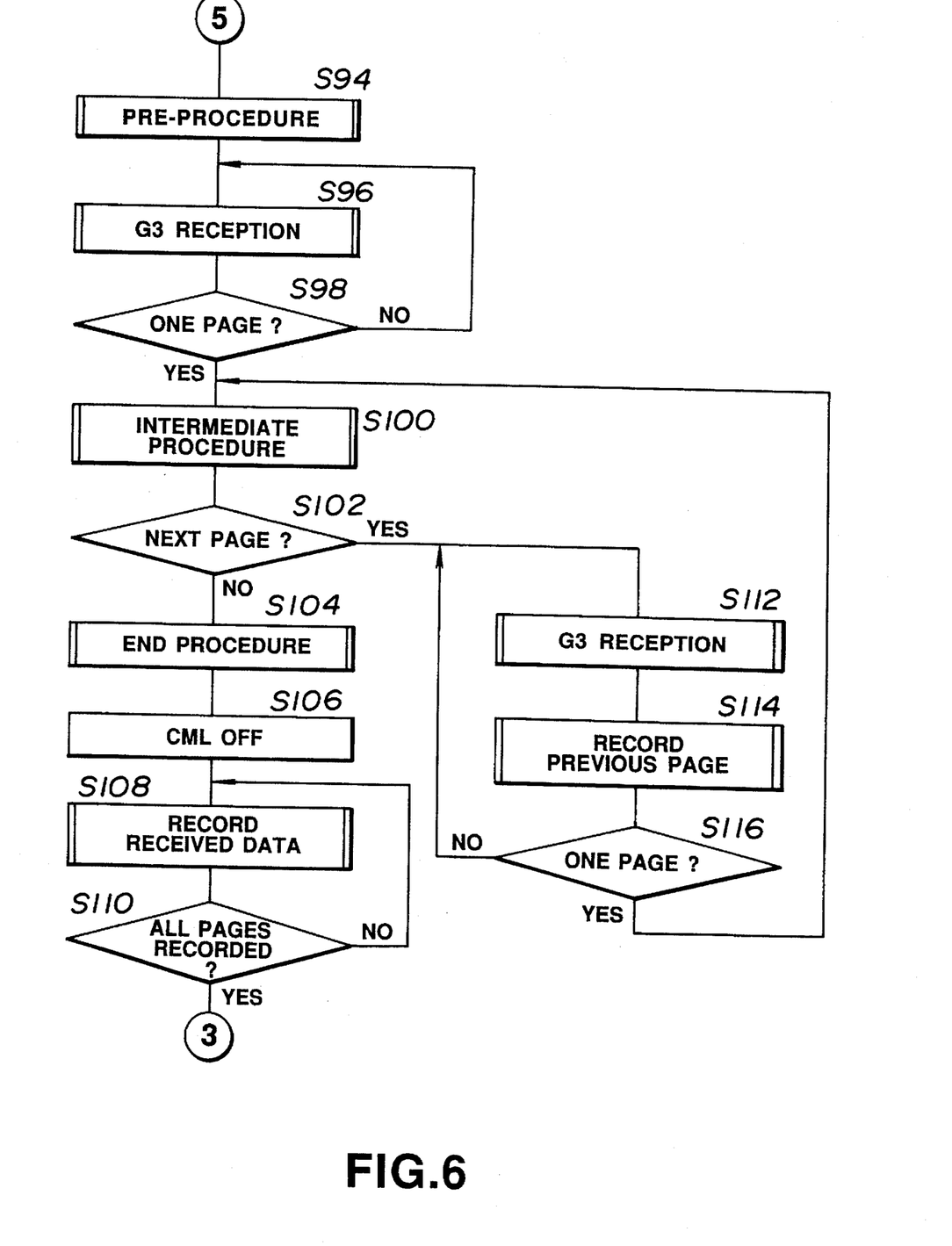

On the other hand, in the case where the apparatus effects G3 image reception, the control circuit 14 shifts from step S54 of FIG. 3 to step S94 of FIG. 6. The control circuit 14 completes the pre-procedure for setting the communication mode (S94). Then the control circuit 14 effects G3 image reception until the control circuit 14 discriminates that data corresponding to one page has been received (S96, S98). The control circuit 14 stores the received data into the image memory 6, decodes the received data, and checks for communication error in step S96.

After receiving data of one page, the control circuit 14 effects an intermediate procedure of G3 image reception (S100). Then the control circuit discriminates whether or not data of a next page will be received (S102). In the case where the data of the next page is received, the control circuit 14 effects G3 image reception as above described in step S96 and starts the recording operation of the data corresponding to the previous page (S112, S114). Then the control circuit 14 discriminates whether or not data corresponding to one page has been received (S116). In the case where the data of one page has been received, the control circuit shifts from step S116 to step S100.

In the case where data of a next page is not received, the control circuit 14 effects a procedure for releasing the telephone line according to G3 procedure (S104) and then turns off the CML relay (S106). After completing the recording operation of the received data which has been stored in the image memory 6, the control circuit 14 returns to an idle condition (S108, S110).

In step S96 and step S112, the control circuit 14 inputs data modulated by the modem 4 and decodes the modulated data. Further, the control circuit 14 checks whether or not the received data has a communication error. The control circuit 14 then determines a response signal, which is sent to the calling station in the facsimile procedure, in accordance with the result of checking for communication error. The response signal is either the MCF (Message Confirmation) signal, the RTP (Retrain Positive) signal or the RTN (Retrain Negative) signal.

Figure 11:
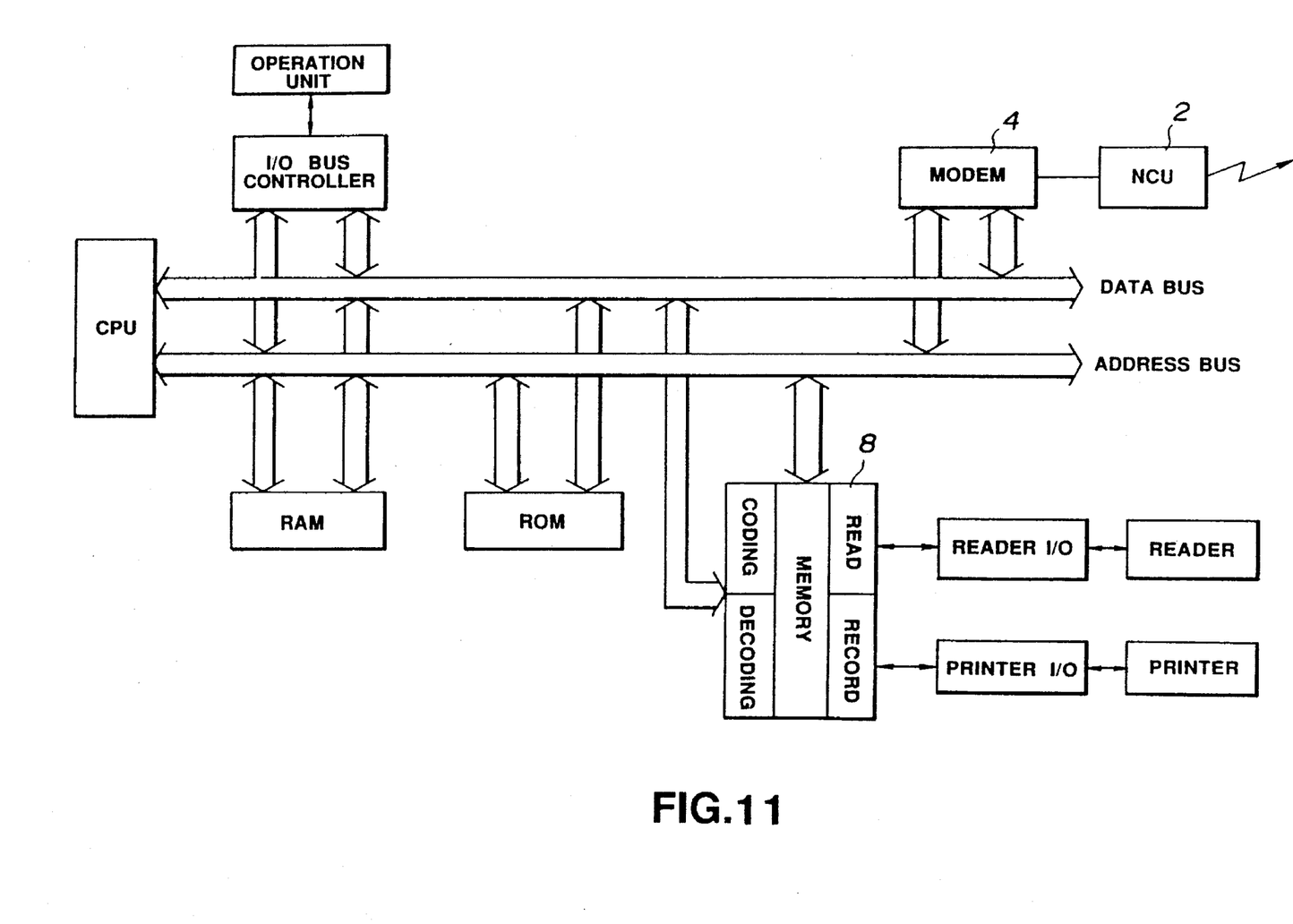
FIG. 11 is a block diagram showing the structure of the facsimile apparatus in this embodiment.

As noted above, FIG. 1 shows the functional structure of the facsimile apparatus. In actuality, the facsimile apparatus in this embodiment is structured as shown in FIG. 11. In FIG. 11, the RAM corresponds to the image memory 6 of FIG. 1. The indicating lamp 13 of FIG. 1 is provided in an operation unit of FIG. 11. The control circuit 14 of FIG. 1 corresponds to the CPU and ROM of FIG. 11.

Figure 7:
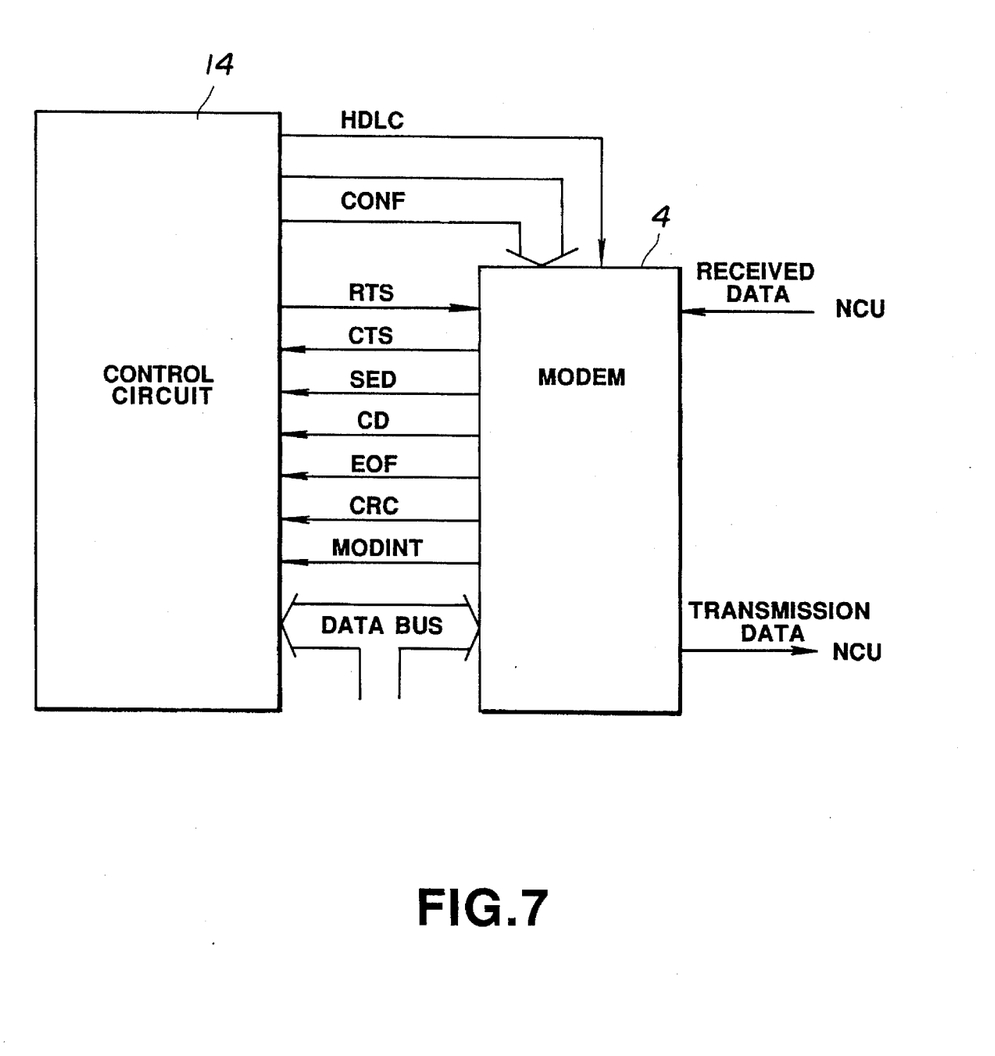
FIG. 7 is a block diagram showing connections between the control circuit 14 and the modem 4.

Next, FIG. 7 is a block diagram showing the connections between the control circuit 14 (CPU of FIG. 11) and the modem 4. In FIG. 7, the received data is modulated data received from the destination, and the transmission data is modulated data which is sent to the destination. The modem 4 is connected to the NCU 2.

A signal HDLC and a signal CONF are signals for setting a mode of the modem 4. In the case where the modem 4 performs the HDLC function, the control circuit 14 sets the signal HDLC to be "1" (high level). The control circuit 14 also designates a transmission speed (300 b/s, 2400 b/s, 4800 b/s, 7200 b/s, and 9600 b/s).

A signal RTS is a signal for requiring the modem 4 to transmit. When the signal RTS becomes "1" (high level), a sequence of transmitting is started by the modem 4. The modem 4 sets a signal CTS to be "1" (high level) when the modem 4 enters a condition capable of transmitting data in response to the signal RTS.

A signal SED, a signal CD, a signal EOF and a signal CRC are status information which are used in data reception. The signal SED becomes "1" when the modem 4 detects some signal (i.e. energy) through the telephone line. The signal SED becomes "0" when the modem 4 does not detect any signal through the telephone line. The signal CD is a signal which indicates a condition of detecting a carrier (a unique signal). The signal CD becomes "1" when the modem 4 detects a carrier, and the signal CD becomes "0" when the modem 4 does not detect any carrier (any unique signal). The signal EOF is a signal which is set to "1" when the modem 4 receives flags for indicating an end of a frame in the reception. The modem 4 outputs the signal CRC when the signal EOF becomes "1". In the case where the received data has a CRC error, the modem 4 sets the signal CRC to be "1".

A signal MODINT is a signal which is set to "1" when the modem 4 has received one byte of data (8 bits of data). When the byte of data is input by the control circuit 14, the modem 4 sets the signal MODINT to "0".

Figure 8:
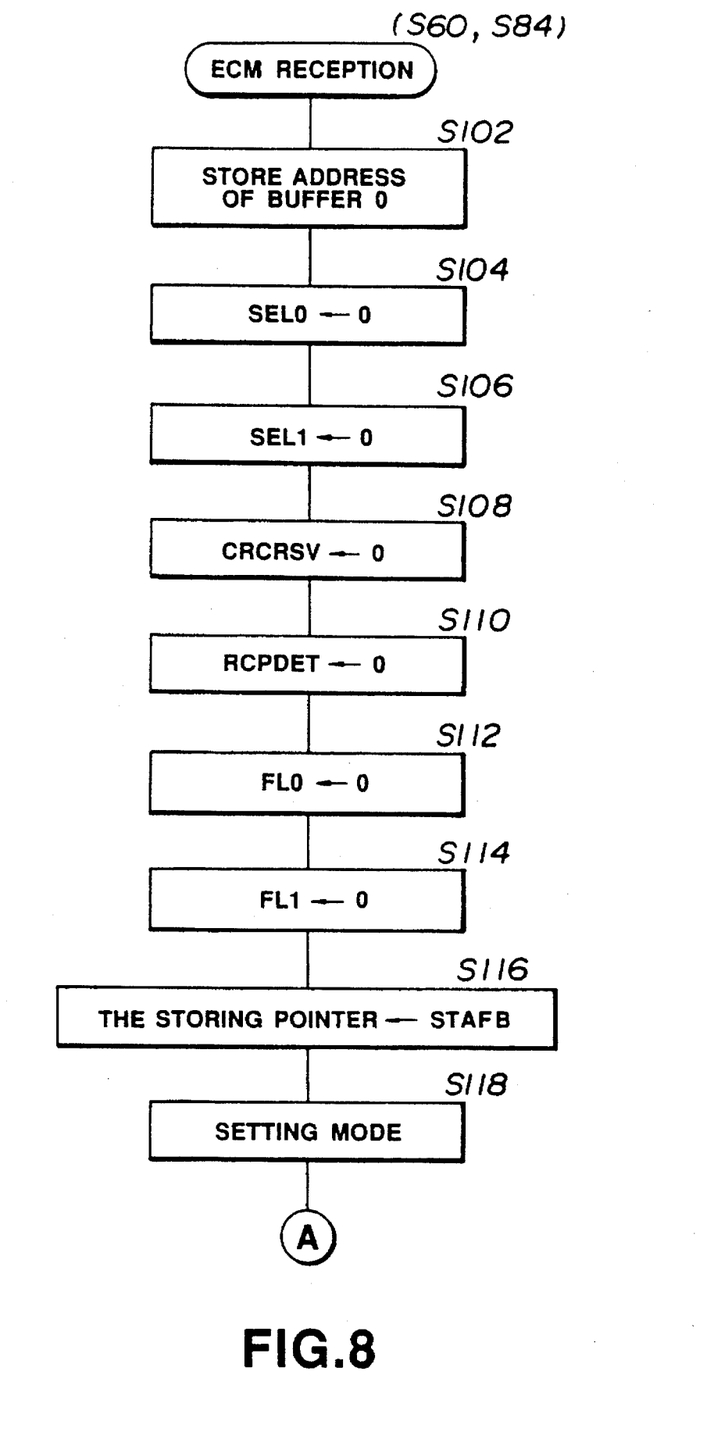
Figure 9:
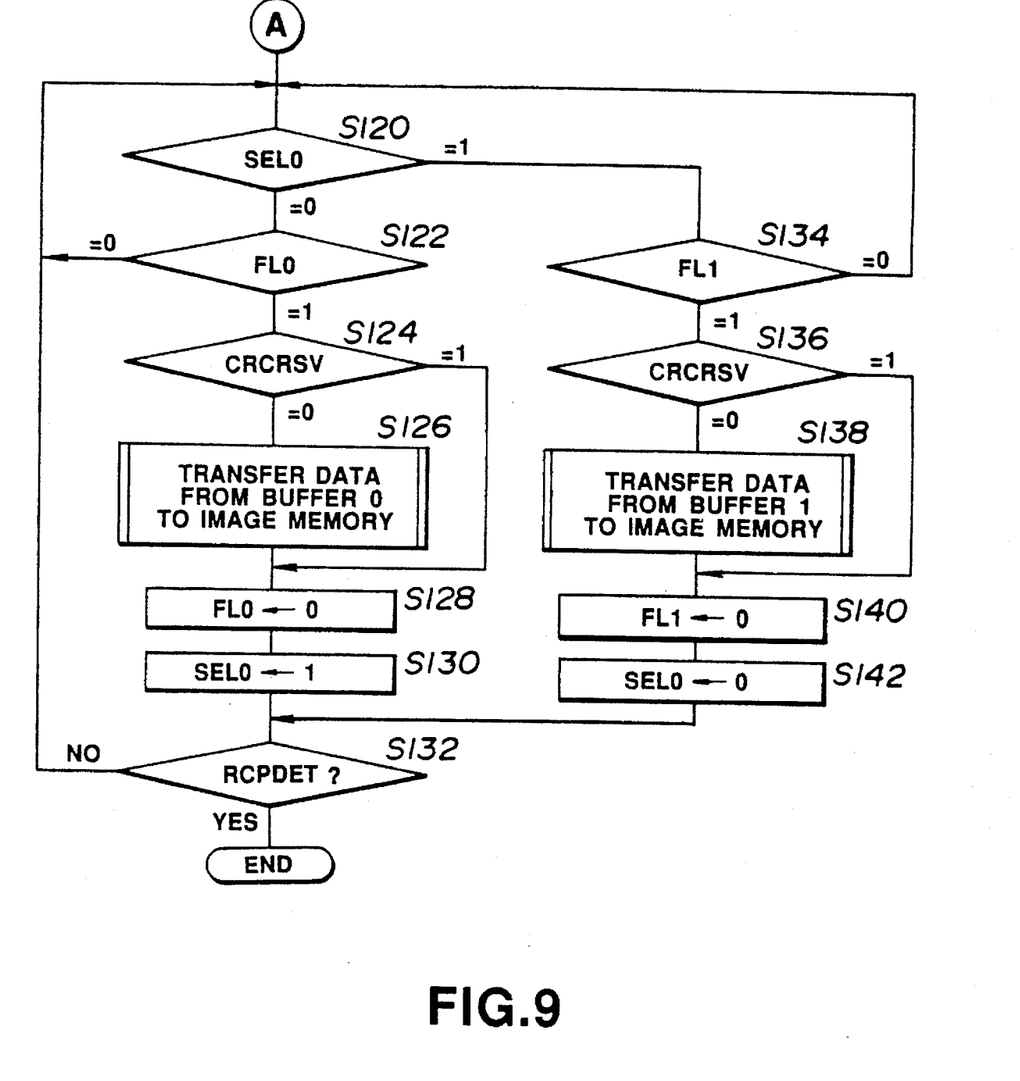
FIG. 9 together form a flowchart showing a main routine when the apparatus effects image reception in ECM (Error Correction Mode).
Figure 10:
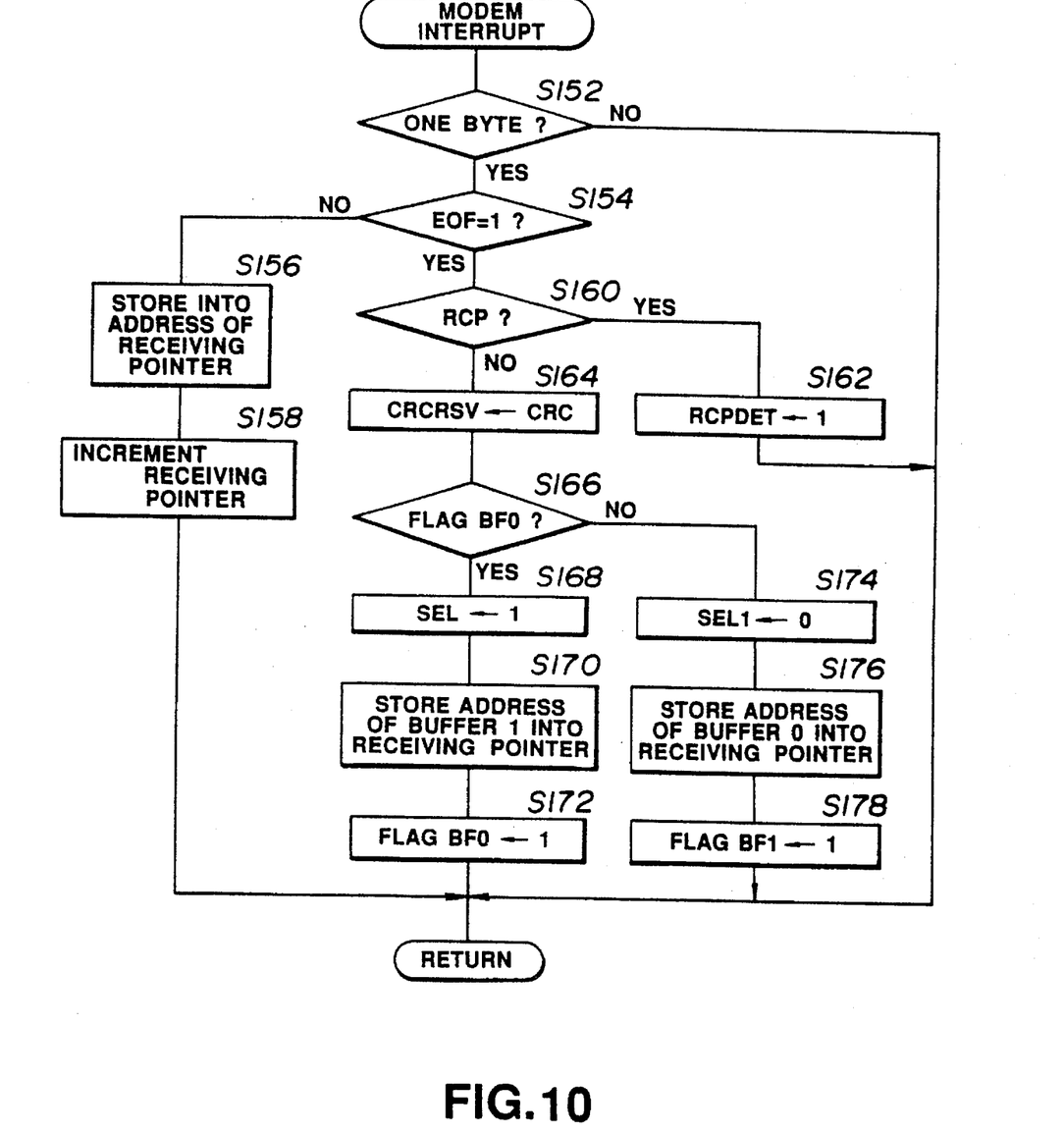
FIG. 10 is a flow chart showing an interrupt routine when the apparatus effects the image reception in ECM.

FIG. 8 and FIG. 9 form a flowchart showing a main control operation of ECM reception, and FIG. 10 is a flow chart showing an interrupt operation of ECM reception.

In ECM reception, frame data of the received image are alternately stored into a buffer 0 and a buffer 1 in accordance with a receiving pointer. The control circuit 14 checks the frame number of the received data, and then stores the frame data into the image memory by using a storing pointer.

The control circuit 14 stores an address of the buffer 0 into the receiving pointer (S102), and then sets a signal SEL0 to be "0" (S104). The signal SEL0 is a signal for selecting the buffer which is used in the main control operation. The control circuit 14 sets a signal SEL1 to be "0" (S106). The signal SEL1 is a signal for selecting the buffer which is used in the interrupt operation.

The control circuit 14 initializes a memory area CRCRSV, where information of the CRC is stored (S108), and initializes a flag RCPDET indicating that a signal RCP (Return to Control Partial page) has been detected (S110). The control circuit 14 sets a flag FL0 to be "0" (S112), and then sets a flag FL1 to be "0" (S114). The flag FL0 and the flag FL1 indicate conditions of storing image data into the buffer 0 and the buffer 1. When any image data is not stored in the buffers, each of the flags FL0 and FL1 are set to "0".

The control circuit 14 sets a start address STAFB of the image memory 6 into the storing pointer (S116). Further, the control circuit 14 sets the signal HDLC to be "1", and sets a reception speed of the modem 4 by using the signal CONF (S118).

Next, the control circuit 14 discriminates whether the signal SEL0 (indicating a condition of the buffer 0) is "0" or "1" (S120) When the signal SEL0 is "0" the control circuit 14 shifts from step S120 to S122. When the signal SEL0 is "1", the control circuit 14 shifts from step S120 to S134.

In step S122, the control circuit 14 discriminates whether the flag FL0 is "0" or "1". When flag FL0 is "0", the control circuit 14 returns to step S120. When the flag FL0 is "1", the control circuit 14 checks the memory area CRCRSV in step S124. In the case where no error of the CRC is stored in the memory area CRCRSV, the control circuit 14 checks the frame number and then transfers the data stored in the buffer 0 to an area of the image memory 6 corresponding to the frame number in step S124.

On the other hand, in the case where some error is stored in the memory area CRCRSV or in the case where the transferring operation in step S126 is completed, the control circuit 14 sets the flag FL0 to "0" (S128) and then sets to the signal SEL0 to "1" (S130).

Next, the control circuit 14 discriminates whether or not the signal RCP has been detected (i.e., whether or not the flag RCPDET has been set to "1") in step S132. If the signal RCP has not been detected, the control circuit 14 returns from step S132 to step S120 and continues to receive image data. If the signal RCP has been detected, the control circuit 14 finishes the ECM image reception (step S60 or step S84).

In step S134, the control circuit 14 discriminates whether the flag FL1 has been set to "1" or "0". In the case where the flag FL1 has been set to "0", the control circuit 14 returns to step S120. In the case where the flag FL1 has been set to "1", the control circuit 14 checks if any error of the CRC is stored in the memory area CRCRSV in step S136. In the case where no error is stored in the memory area CRCRSV, the control circuit 14 checks the frame number and then transfers the data stored in the buffer 1 to an area of the image memory 6 corresponding to the frame number in step S138.

On the other hand, in the case where some error is stored in the memory area CRCRSV, or in the case where the transferring operation in step S138 is completed, the control circuit 14 sets the flag FL1 to "0" (S140) and sets the signal SEL0 to "0" (S142), and then shifts to step S132.

While the control circuit 14 is effecting the ECM image reception shown in FIG. 8 and FIG. 9, the control circuit 14 can effect the interrupt operation shown in FIG. 10 in response to an interrupt request by the signal MODINT from the modem 4. In step S152, the control circuit 14 discriminates whether or not one byte of data exists. In the case where one byte of data does not exist, the control circuit 14 returns to the main control operation of FIG. 8 or FIG. 9.

In step S154, the control circuit 14 discriminates whether or not the modem 4 has detected flags for indicating an end of a frame (whether the signal EOF is "0" or "1"). In the case where the signal EOF is "0", the control circuit 14 stores the one byte of data into an address indicated by the receiving pointer (S156), and then increments the receiving pointer (S158). In the case where the signal EOF is "1", the control circuit 14 discriminates if the signal RCP has been detected or not (S160). If the signal RCP has been detected, the control circuit 14 sets the flag RCPDET to "1" and then returns to the main control operation (S162). If the signal RCP has not been detected, the control circuit 14 inputs information of the CRC from the modem 4 and stores the information into the memory area CRCRSV (S164).

Next, in step S166, the control circuit 14 discriminates whether the buffer storing data is the buffer 0 or the buffer 1. In the case of the buffer 0, the control circuit 14 sets the signal SEL1 to "1" in step S168, indicating that next data should be stored in the buffer 1. The control circuit 14 stores an address of the buffer 1 into the receiving pointer (S170), sets flag BF0 to "1", which indicates that the buffer 0 is full (S172), and then returns to the main control operation.

In the case of the buffer 1 in step S166, the control circuit 14 sets the signal SEL1 to "0" in step S174, indicating that the next data should be stored in the buffer 0. The control circuit 14 stores an address of the buffer 0 into the receiving pointer (S176), sets flag BF1 to "1", which indicates that the buffer 1 is full (S178), and then returns to the main control operation.

The foregoing embodiment does not store the transmission information while effecting the procedure. However, effecting this procedure is easier than decoding. Therefore the apparatus is able to be structured so as to effect the storing operation during not only image communication but also the procedure.

The foregoing embodiment effects ECM image reception as a communication mode capable of detecting an error. But the present invention is also applicable to an apparatus capable of effecting communication of code data by using the HDLC format, for example.

Further, the foregoing embodiment records data at a fixed speed, but the invention is also applicable to an apparatus recording data intermittently, for example.

Of course, the present invention is not limited to the foregoing embodiments, but is subject to various modifications.

What is claimed is:

1. An image communication apparatus for receiving coded data in an image reception, and being operable according to a first mode which checks for a communication error by decoding received coded image data and a second mode which checks for a communication error by checking specific information in the received coded image data without decoding the received coded image data comprising:

means for effecting a local operation;

means for effecting image reception selectively according to the first mode and the second mode; and control means for controlling the image reception and the local operation, and for effecting the local operation in response to a manual instruction during image reception according to the second mode, wherein said control means affects both the local operation and the image reception according to the second mode in parallel, and does not effect the local operation in response to the manual instruction during image reception according to the first mode.

2. An image communication apparatus according to claim 1, wherein the second mode is an error correction mode defined by CCITT.

3. An image communication apparatus according to claim 6, further comprising display means for displaying an indication that the apparatus is in a condition capable of effecting the local operation.

4. An image communication apparatus according to claim 3, wherein said control means controls said display means to display said indication when said memory has a vacant area and the apparatus is in the second mode.

5. An image communication apparatus according to claim 1, wherein the local operation is an operation of storing image data to be transmitted into a memory.

6. An image communication apparatus according to claim 1, further comprising decoding circuit for decoding the received coded image data in the first mode.

7. An image communication apparatus according to claim 6, wherein said control means checks for a communication error without decoding the received image data in the second mode, and checks for a communication error by using the received image data decoded by said decoding circuit in the first mode.

8. A method of controlling a local operation and image reception in an image communication apparatus having a first mode which checks for a communication error by decoding received coded image data and a second mode which checks for a communication error by checking specific information in received coded image data without decoding the received coded image data, comprising the steps of:

effecting image reception according to a selected one of the first mode and the second mode;

effecting the local operation in response to a manual instruction during image reception according to the second mode, and effecting both the local operation and the image reception according to the second mode in parallel; and prohibiting the local operation in response to a manual instruction during image reception according to the first mode.

9. A method according to claim 8, wherein the second mode is an error correction mode defined by CCITT.

10. A method according to claim 8, wherein the local operation is an operation of storing image data to be transmitted into a memory.

11. A method according to claim 10, wherein the image reception according to the second mode stores the received image data into the memory without decoding the received image data.

12. A method according to claim 8, further comprising a step of displaying that the apparatus is in a condition capable of effecting the local operation.

* * * * *

UNITED STATES PATENT AND TRADEMARK OFFICE
CERTIFICATE OF CORRECTION

PATENT NO. : 5,581,373
DATED : December 3, 1996
INVENTOR(S) : Takehiro Yoshida

It is certified that error appears in the above-indentified patent and that said Letters Patent is hereby corrected as shown below:

TITLE PAGE

AT [56] REFERENCES CITED, FOREIGN PATENT DOCUMENTS
"1282665 11/1989 Japan" should read --1-282665 11/1989 Japan--.

COLUMN 3
Line 57, "is" should be deleted.

COLUMN 5
Line 2, "operation (S47)." should read --operation (S48).--.

COLUMN 8
Line 11, "to" (second occurrence) should be deleted.

COLUMN 9
Line 48, "6," should read --1,--.

Signed and Sealed this

Thirteenth Day of May, 1997

Attest:

BRUCE LEHMAN

Attesting Officer     Commissioner of Patents and Trademarks